(No Model.)

E. W. KENT.
MARBLE OR GRANITE SAW.

No. 372,679. Patented Nov. 8, 1887.

Witnesses:
Bert Curtis
Charles Ahinger

Inventor:
Enoch W. Kent

N. PETERS, Photo-Lithographer, Washington, D. C.

UNITED STATES PATENT OFFICE.

ENOCH W. KENT, OF CROWN POINT, NEW YORK.

MARBLE OR GRANITE SAW.

SPECIFICATION forming part of Letters Patent No. 372,679, dated November 8, 1887.

Application filed December 18, 1886. Serial No. 221,991. (No model.)

*To all whom it may concern:*

Be it known that I, ENOCH W. KENT, of Crown Point, county of Essex, and State of New York, have invented a certain Improvement in Saws, of which the following is a specification, reference being had to the accompanying drawings, forming part of the same.

This is an improvement in the class of saws intended especially for the sawing of marble or granite.

My improvement consists in making the saw of one solid piece of metal having a crimped edge, the crimped parts projecting at even angles on each side of the edge of the saw and at any distance apart desired. On the extreme edge of each projecting crimped part are set, in the edge thereof, irregular pieces of chilled steel, iron, diamonds, garnets, or any other hard and suitable substance desirable, to act as teeth in cutting the stone, the settings thereof being in rows running parallel with the saw-plate, but each setting alternating in the rows, forming two rows of teeth, in the manner aforesaid, on the cutting edge of the saw; and, if desirable, one or more rows may be added by inserting between those aforesaid, alternately, other rows of the cutting substances, substantially as set forth.

Figure 1:
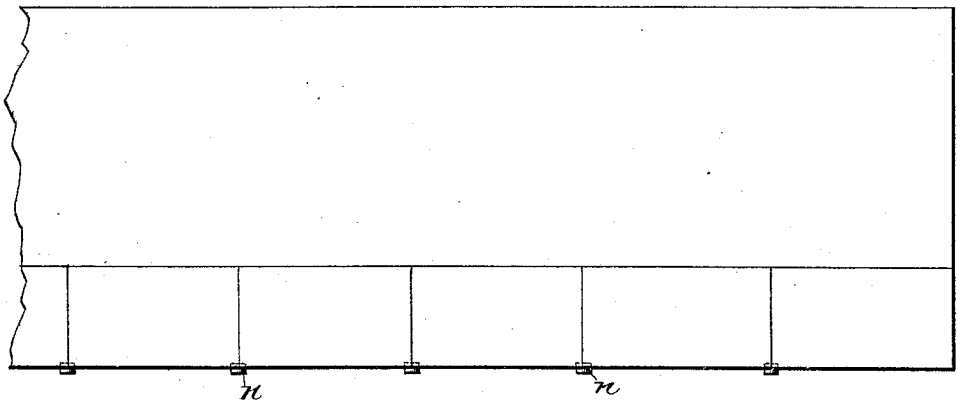
Figure 2:
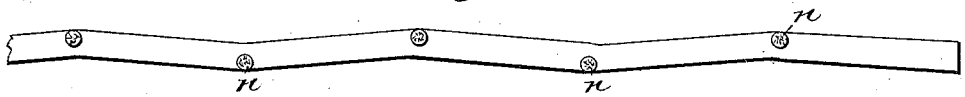
Figure 3:
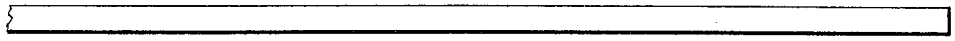
Figure 4:
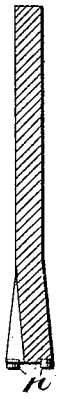

In the drawings, Figure 1 is a section of a saw, side view. Fig. 2 is the cutting-edge of the saw in its crimped form, with the letter N, representing the teeth thereof, set in the edge on the crimped parts, showing the place and manner of the settings of the substances used as teeth. Fig. 3 represents the back edge view of the saw. Fig. 4 is a cross-section of saw, showing its crimped edge.

The saw consists of a body, Fig. 1, made of a single piece of soft iron or steel, or of any suitable metal, in the form of a plate of any width or thickness desired. One edge of the plate is crimped, the crimped parts extending at right angles with the sides of the plate and on each side thereof, the projecting part on one side being opposite a concave or hollow place on the other side, making the cutting-edge wider than the upper edge or back of the saw, thus enabling the saw to cut a wider kerf and to work freely, true, and rapidly while operating. The substances used as teeth are set into the edge of the plate by cutting grooves or holes to receive them, and by inserting the same therein, and by then tightening the same in place by upsetting and swaging the edge of the groove or hole around the substance.

As a part of my invention, a straight-edged plate of metal can be used as the saw-blade, having both the cutting edge and the upper edge or back straight edges; and on one edge thereof may be set cutting substances like the above, in rows or alternately as teeth, forming the cutting-edge thereof, substantially as the above, except the crimped edge.

I do not claim as any part of my invention the simple art of setting substances in metal by inserting them in grooves or holes prepared therein to receive them and by upsetting or swaging the edge of the same to tighten them in place.

What I claim as my invention is—

1. A saw for sawing stone, consisting of a blade the cutting-edge of which is crimped into zigzag form, in combination with suitable cutting points or studs of harder material mounted in said zigzag edge, substantially as set forth.

2. A stone-saw blade, straight and plain upon the back edge and having the front or cutting edge of zigzag form, the outer angles thereof being set with harder abrading cutters, whereby the saw-kerf is cut wider than the thickness of the saw-plate, substantially as set forth.

ENOCH W. KENT.

In presence of—
BERT CURTIS,
CHARLES A. RINGER.